US008598728B2

(12) United States Patent
Navetta

(10) Patent No.: US 8,598,728 B2
(45) Date of Patent: Dec. 3, 2013

(54) REDUNDANT COMBUSTION ENGINE STARTING SYSTEMS FOR EMERGENCY GENERATORS

(76) Inventor: Frank Navetta, East Setauket, NY (US)

( * ) Notice: Subject to any disclaimer, the term of this patent is extended or adjusted under 35 U.S.C. 154(b) by 507 days.

(21) Appl. No.: 13/008,301

(22) Filed: Jan. 18, 2011

(65) Prior Publication Data

US 2011/0175357 A1 Jul. 21, 2011

Related U.S. Application Data

(60) Provisional application No. 61/296,292, filed on Jan. 19, 2010.

(51) Int. Cl.
*F02B 63/04* (2006.01)
*H02K 7/18* (2006.01)

(52) U.S. Cl.
USPC .......... 290/47; 290/40 R

(58) Field of Classification Search
USPC .......... 290/40 R, 40 C, 47, 48
See application file for complete search history.

(56) References Cited

U.S. PATENT DOCUMENTS 3,722,210 A * 3/1973 Kuhn .......... 60/625
3,794,009 A * 2/1974 Wenrich et al. .......... 123/179.31
4,170,210 A * 10/1979 Janik, Jr. .......... 123/179.31
5,156,000 A * 10/1992 Mallofre .......... 60/612
7,240,653 B2 * 7/2007 Marchand et al. .......... 123/179.19
7,882,816 B2 * 2/2011 Eichenberger et al. .......... 123/179.31
8,319,356 B2 * 11/2012 Fonseca .......... 290/1 A

* cited by examiner

*Primary Examiner* — Nicholas Ponomarenko
(74) *Attorney, Agent, or Firm* — Carter, DeLuca, Farrell & Schmidt, LLP

(57) ABSTRACT

The present disclosure relates to an engine-generator having an engine, an electrical generator and a control panel configured to control the engine-generator. The engine-generator includes a first electrical starter having a first battery, a first solenoid configured to receive a starting signal from the control panel and a first starter motor configured to crank the engine when the first solenoid receives the starting signal from the control panel. The engine generator also includes a second electrical starter including a second battery, a second solenoid configured to receive a starting signal from the control panel and a second starter motor configured to crank the engine when the second solenoid receives the starting signal from the control panel.

7 Claims, 7 Drawing Sheets

REDUNDANT COMBUSTION ENGINE STARTING SYSTEMS FOR EMERGENCY GENERATORS

CROSS REFERENCE TO RELATED APPLICATIONS

The present application claims priority to U.S. Provisional Application Ser. No. 61/296,292, filed Jan. 19, 2009, entitled "REDUNDANT COMBUSTION ENGINE STARTING SYSTEMS FOR EMERGENCY GENERATORS," the contents of which are hereby incorporated by reference in their entirety.

BACKGROUND

1. Technical Field

The present disclosure relates generally to engine starting systems for a generator. More particularly, the present disclosure is directed to an engine starting system that includes multiple starting systems to facilitate improved starting performance and redundant functionality to enhance engine starting reliability.

2. Background of the Related Art

Engine-powered electrical generators in fixed installations are used occasionally in emergency situations when the primary supply of electricity is disrupted as, for example, by storm or by high wind. These engine-powered electrical generators generate electricity in emergency situations, such as for hospitals, to supply light and power to emergency rooms. Other commercial properties such as malls, banks and office spaces depend upon such engine-powered electrical generators when the electricity is cut-off. At times the cut-off of electricity is long and businesses depending on computers can not afford to be shut down because of the loss of power.

Such engine-powered electrical generators typically include a generator, an engine, a fuel source (e.g., diesel fuel), a control panel and a starter for the engine. The starter cranks the engine to start the engine thereby causing the generator to supply power. However, if the starter is defective or malfunctioning, the engine can not be started and, as such, power can not be supplied in emergency situations. Therefore, there is a need to provide an engine-powered electrical generator that can overcome the defective or malfunctioning starter so that the engine-powered electrical generator can be relied upon to provide power when the primary supply of electricity is disrupted.

SUMMARY

In an embodiment of the present disclosure, an engine-generator having an engine, an electrical generator and a control panel configured to control the engine-generator is provided. The engine-generator may include a first electrical starter having a first battery, a first solenoid configured to receive a starting signal from the control panel and a first starter motor configured to crank the engine when the first solenoid receives the starting signal from the control panel. The engine-generator may also include a second electrical starter having a second battery, a second solenoid configured to receive a starting signal from the control panel and a second starter motor configured to crank the engine when the second solenoid receives the starting signal from the control panel.

The first electrical starter and the second electrical starter may crank the engine simultaneously or sequentially. The first electrical starter may include a first electric charger configured to recharge the first battery and the second electrical starter may include a second electric charger configured to recharge the second battery. A battery charger switch may also be provided to select either the first electric charger or the second electric charger to recharge the first battery or the second battery.

The engine-generator may also include an alternator and a dual battery charger configured to recharge the first battery and the second battery.

In another embodiment of the present disclosure, an engine-generator having an engine, an electrical generator and a control panel configured to control the engine-generator is provided. The engine-generator may also include an electrical starter having a battery, a solenoid configured to receive a starting signal from the control panel and a starter motor configured to crank the engine when the solenoid receives the starting signal from the control panel. The engine-generator may also include a hydraulic starter having a solenoid valve configured to receive a starting signal from the control panel, a hydraulic starter motor configured to crank the engine when the solenoid valve receives the starting signal from the control panel and a hydraulic accumulator configured to supply pressurized hydraulic fluid to the hydraulic starter motor when the solenoid valve receives the starting signal from the control panel.

The electrical starter may include an electric charger or an alternator configured to recharge the battery. The engine-generator may also include a reservoir tank configured to receive hydraulic fluid from the hydraulic starter motor and a recharge pump configured to supply the hydraulic accumulator with the hydraulic fluid from the reservoir tank. The hydraulic starter may also include a manual bypass to crank the engine.

In yet another embodiment of the present disclosure, an engine-generator having an engine, an electrical generator and a control panel configured to control the engine-generator is provided. The engine-generator may also include an electrical starter having a battery, a solenoid configured to receive a starting signal from the control panel and a starter motor configured to crank the engine when the solenoid receives the starting signal from the control panel. The engine-generator may also include an air starter having a solenoid valve configured to receive a starting signal from the control panel, an air starter motor configured to crank the engine when the solenoid valve receives the starting signal from the control panel and an air accumulator configured to supply compressed air to the air starter motor when the solenoid valve receives the starting signal from the control panel.

The electrical starter may include an electric charger or an alternator configured to recharge the battery. A compressor configured to supply the air accumulator with air from atmosphere may also be provided. The compressor may be driven by the engine or by an electric motor. The air starter may further include a manual bypass to crank the engine.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION

Particular embodiments of the present disclosure are described hereinbelow with reference to the accompanying drawings; however, it is to be understood that the disclosed embodiments are merely exemplary of the disclosure and may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Figure 1:
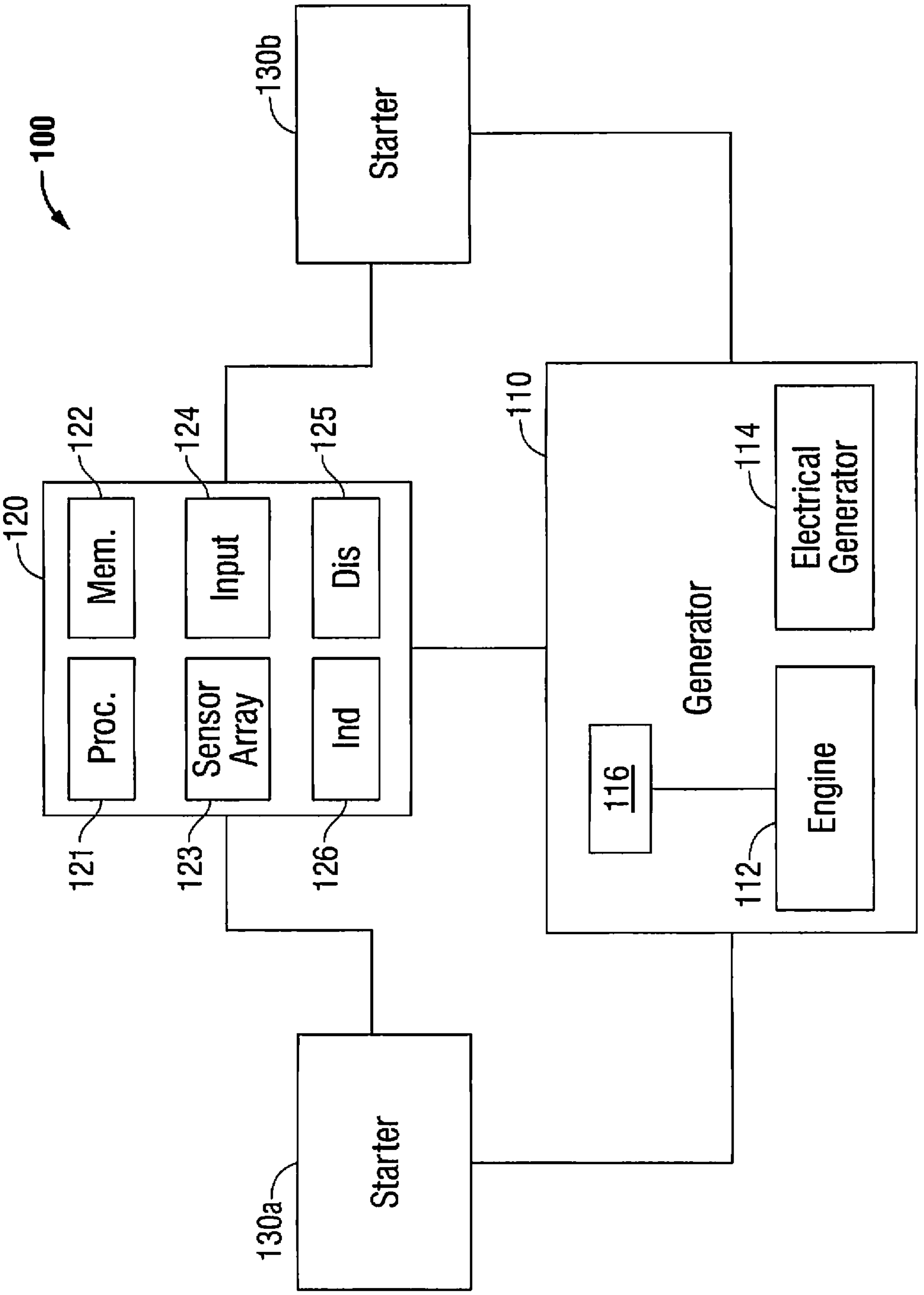
FIG. 1 depicts a general system block diagram of a generator system according to an embodiment of the present disclosure.

Turning to FIG. 1, a generator system according to an embodiment of the present disclosure is shown generally as generator system 100. Generator system 100 includes a generator 110 that may be an engine-generator or genset. Generator 110 is a combination of an engine 112 and an electrical generator 114 mounted together to form a single piece of equipment. Generator 110 may also include a fuel supply, a constant engine speed regulator or governor, a generator voltage regulator, cooling system, exhaust system and a lubrication system. Generator 110 may also include a sensor 116 that may be a magnetic pick up device that detects the revolutions per minute (RPM) of the engine. The magnetic pick up device is a typical device currently employed for this purpose, having a pencil magnetic tip that, when installed facing the flywheel teeth, produces an electric current as the teeth pass by. The resulting current is directly proportional to rpm speed and can be measured and acted upon using a limiting voltmeter and crank disconnect relay. Generator system 100 may be started manually by a user, automatically started at a time scheduled by a user or automatically started if a main power system is inoperable.

A control panel 120 controls the operation of generator system 100. Control panel 120 includes a processor 121, memory 122, sensor array 123, input device 124 and a display 125. Control panel 120 may be included in a single unit or it may be composed of different components that are electrically coupled to each other. Processor 121 may be an integrated circuit or may include analog and/or logic circuitry that may be used to: execute instructions according to inputs provided by the input device 124 or sensor array 123, execute instructions according to a program provided in memory 122; and control operation of generator system 100.

Memory 122 may be volatile type memory (e.g., RAM) and/or non-volatile type memory (e.g., flash media, disk media, etc.) that stores programs or sets of instructions for the operation of generator system 100. Such programs include a number of starting modes that may be used to start the engine of generator 110. The starting modes include a simultaneous mode or sequential mode which will be described in more detail hereinbelow with regard to FIG. 4. The starting modes may be automatically selected by processor 121 or selected by a user using input device 124.

Input device 124 may include a keyboard, a touch screen input device, switches and/or buttons to control operation of generator system 100. Input device 124 may be used to; select between starting modes; start generator 110; stop generator 110; turn off generator 110.

Display 125 may include a liquid crystal display, a plurality of light emitting diodes (LED) or any other display that may provide a visual indication to a user. Display 125 may output a status of the generator, the charge remaining in each battery located in generator system 100, the fuel level of generator system 100, the starting mode for generator system 100 or any other information regarding generator system 100.

Control panel 120 also includes an indicator 126 that may be a visual indicator such as a light source or a series of light sources (e.g., light bulb, LED, neon light bulb, etc.) or an audio indicator such as a speaker. Indicator 126 may be used to inform a user of the status of generator 110 (start, stop, cranking, etc.), a low battery voltage alarm, a low fuel alarm, an over crank fault, a start failure, a low output voltage alarm, a low start air fault, a low start pressure fault or the like. Alternatively, indicator 126 may include a contact closure that may alert a central station alarm service of a fault in generator system 100.

Generator system 100 includes two starting motor pads or starting systems 130*a* and 130*b*. Starting system 130*a* may be an electric system, pneumatic system or hydraulic system. Starting system 130*b* may be an electric system, pneumatic system or hydraulic system. Accordingly, generator system 100 may include any combination of starting system, e.g., 2 electric systems, 2 pneumatic systems, 2 hydraulic systems, 1 pneumatic system and 1 hydraulic system, 1 electric system and 1 pneumatic system, and 1 electric system and 1 hydraulic system. The combination of starting systems may be included by standard design, optional design or custom machining. The different starting systems will be discussed in more detail below with regard to FIGS. 2, 4 and 6.

Figure 2:
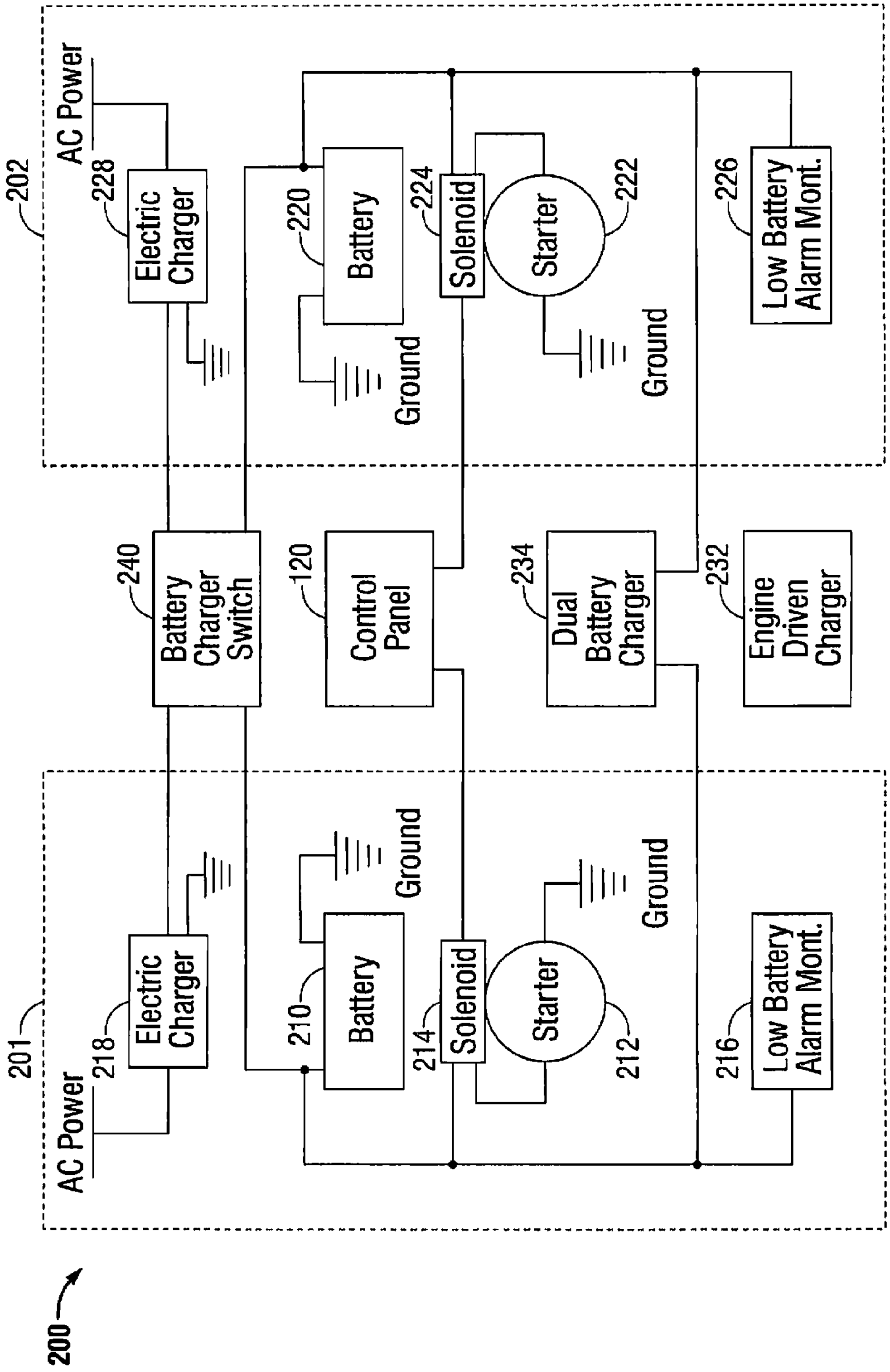
FIG. 2 depicts a system block diagram of a starting system for a generator according to an embodiment of the present disclosure.

Turning to FIG. 2, a dual starting system is shown generally as system 200. System 200 includes two electric starters 201 and 202. Electric starters 201 and 202 include battery packs 210, 220, starter motors 212, 222 and solenoids 214, 224. Each battery pack 210 and 220 may include 12 volts direct current (vDC) battery or two 12 vDC batteries in series and the appropriate battery rack. The batteries may be lead acid batteries, Nickel Cadmium (NiCad) batteries or the like. Each battery pack 210 and 220 is duly connected to solenoid 214 and 224 respectively. Each battery pack 210 and 220 may include a battery disconnect switch (not shown) that allows a user to disconnect the respective battery pack from generator system 100 for maintenance and/or testing.

Solenoids 214 and 224 are electrically operated starter solenoids that receive a starting signal from control panel 120. When solenoids 214 and 224 receive a start signal from control panel 120, solenoids 214 and 224 initiate engine cranking and starting according to the selected starting mode that will be described in more detail below with regard to FIG. 3. More specifically, when solenoids 214 and 224 receive a starting signal from control panel 120, battery packs 210 and 220 supply power to starter motors 212 and 222 respectively. Starter motors 212 and 222 crank engine 112 of generator 110 (FIG. 1) according to a routine stored in memory 122 of control panel 120. After the routine is completed, engine 112 is either started or a fault alarm is provided to a user via indicator 126. Low battery sensors 216 and 226 are used to determine the voltage levels of battery packs 210 and 220 respectively. If sensors 216 and/or 226 detect a low voltage, sensors 216 and 226 would provide a signal to control panel 120 which would alert a user via indicator 126 or disconnect the system for maintenance and/or testing.

Electric starters 201 and 202 include electric chargers 218 and 228 respectively. Electric chargers 218 and 228 receive an alternating current (AC) input and convert the AC input to provide a 12 vDC or 24 vDC and a minimum of 3 amperes to battery packs 210 and 220 to charge battery packs 210 and 220. System 200 may include a battery charger switch 240. Battery charger switch 240 electrically couples electric charger 218 to battery 210 and electric charger 228 to battery 220. If electric charger 218 or 228 is malfunctioning, battery charger switch 240 can be actuated to allow the functioning electric charger of one electric starter to charge the battery of the electric starter having the malfunctioning electric charger. Battery charger switch 240 may be manually operated or controlled by control panel 120.

Starting system 200 may also include an engine driven charger or alternator 232. An alternator is an electromechanical device that converts mechanical energy to electrical energy in the form of alternating current. Energy generated by alternator 232 is provided to a dual battery charger 234 that recharges battery packs 210 and 220.

Figure 3:
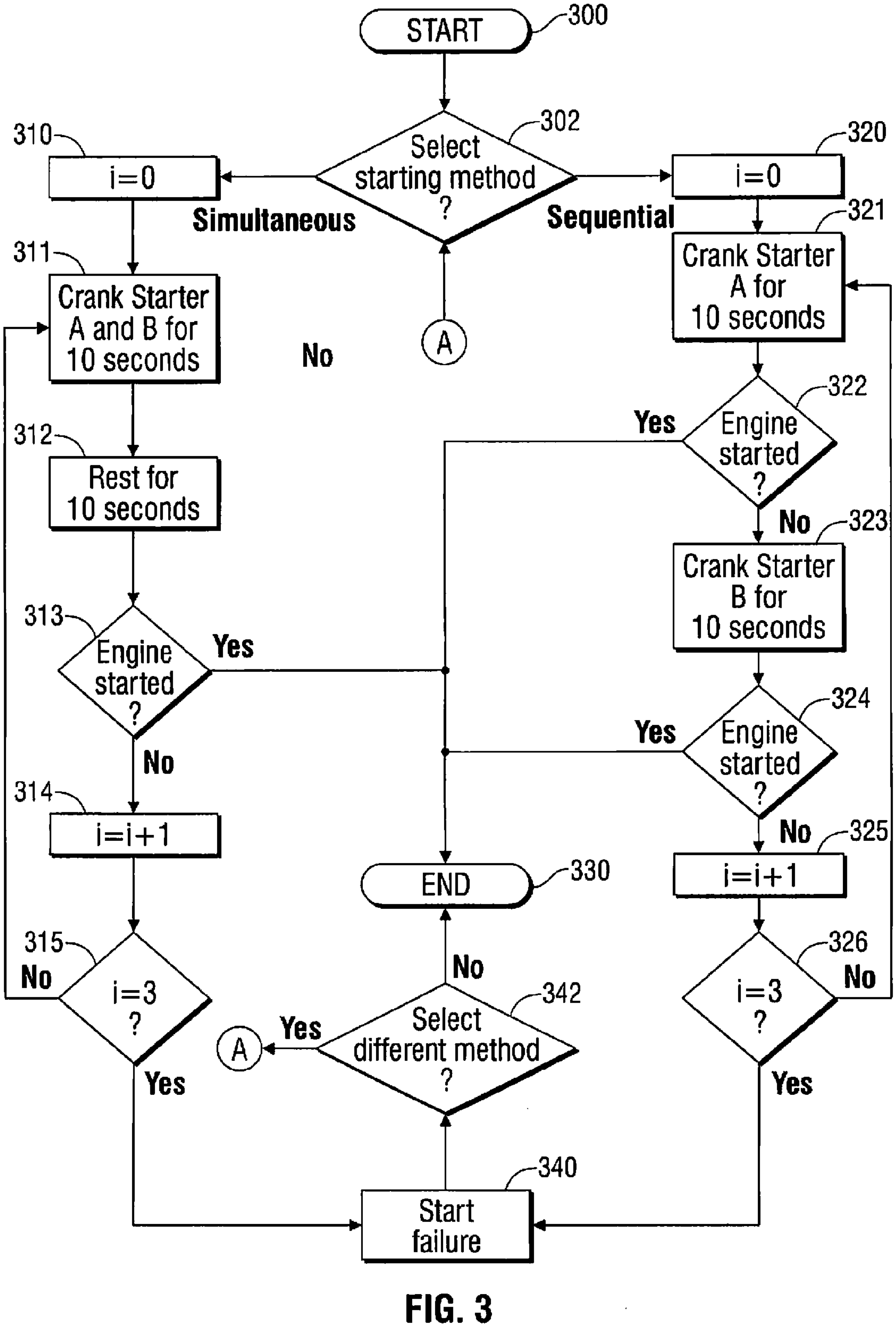
FIG. 3 is a flow chart depicting a method of starting the generator according to an embodiment of the present invention.

A flowchart depicting an operation of a dual starter system having two electric starters (starter A and starter B) is shown in FIG. 3. The process starts in step 300 when the control panel 120 is instructed to start generator 110. Generator 110 may be started upon receiving an input from a user or when power from a main power supply (e.g., a utility company) is disrupted. Control panel selects a starting method in step 302 based on an input from a user or an instruction stored in memory 122. If a simultaneous mode is selected, the process proceeds to step 310 where a counter (in processor 121) is set to "0". In step 311, starter A and starter B is cranked simultaneously for a period of time, e.g., 10 seconds. A digital timer (not shown) in control panel 120 or processor 121 may be used to control the amount of time starter A and starter B are cranked. In step 312, starter A and starter B rest for a period of time, e.g., 10 seconds. If control panel 120 determines that engine 112 has started in step 313, the process proceeds to step 330 that ends the starting sequence because engine 112 is operating.

If control panel 120 determines that engine 112 has not started, control panel 120 increments the counter by one in step 314. In step 315, processor 121 determines if the value of the counter is equal to 3. If the counter value is not 3, the control panel proceeds to step 311 to start another cranking cycle. If the value of the counter has equaled three, then the process proceeds to step 340 and control panel indicates a start failure via indicator 126.

If the sequential starting mode is selected, the process proceeds to step 320 where a counter (in processor 121) is set to "0". In step 321, starter A is cranked for a period of time, e.g., 10 seconds. In step 322, control panel 120 determines whether engine 112 has started. If engine 112 has started, the process proceeds to step 330 where the starting sequence ends.

If control panel 120 determines that engine 112 has not started, control panel 120 cranks starter B for a period of time, e.g., 10 seconds. In step 324, control panel 120 determines whether engine 112 has started. If engine 112 has started, the process proceeds to step 330 where the starting sequence ends.

If control panel 120 determines that engine 112 has not started, control panel 120 increments the counter by one in step 325. In step 326, processor 121 determines if the value of the counter is equal to 3. If the counter value is not 3, the control panel proceeds to step 321 to start another cranking cycle. If the value of the counter has equaled three, then the process proceeds to step 340 and control panel indicates a start failure via indicator 126.

After a start failure, control panel 120 may prompt the user to select another starting mode or may select another starting mode automatically based on an instruction stored in memory 122 in step 342. If another starting mode is to be selected, the process returns to step 302 to select another starting method. Otherwise, the process proceeds to step 330 where the starting operation is ended.

Figure 4:
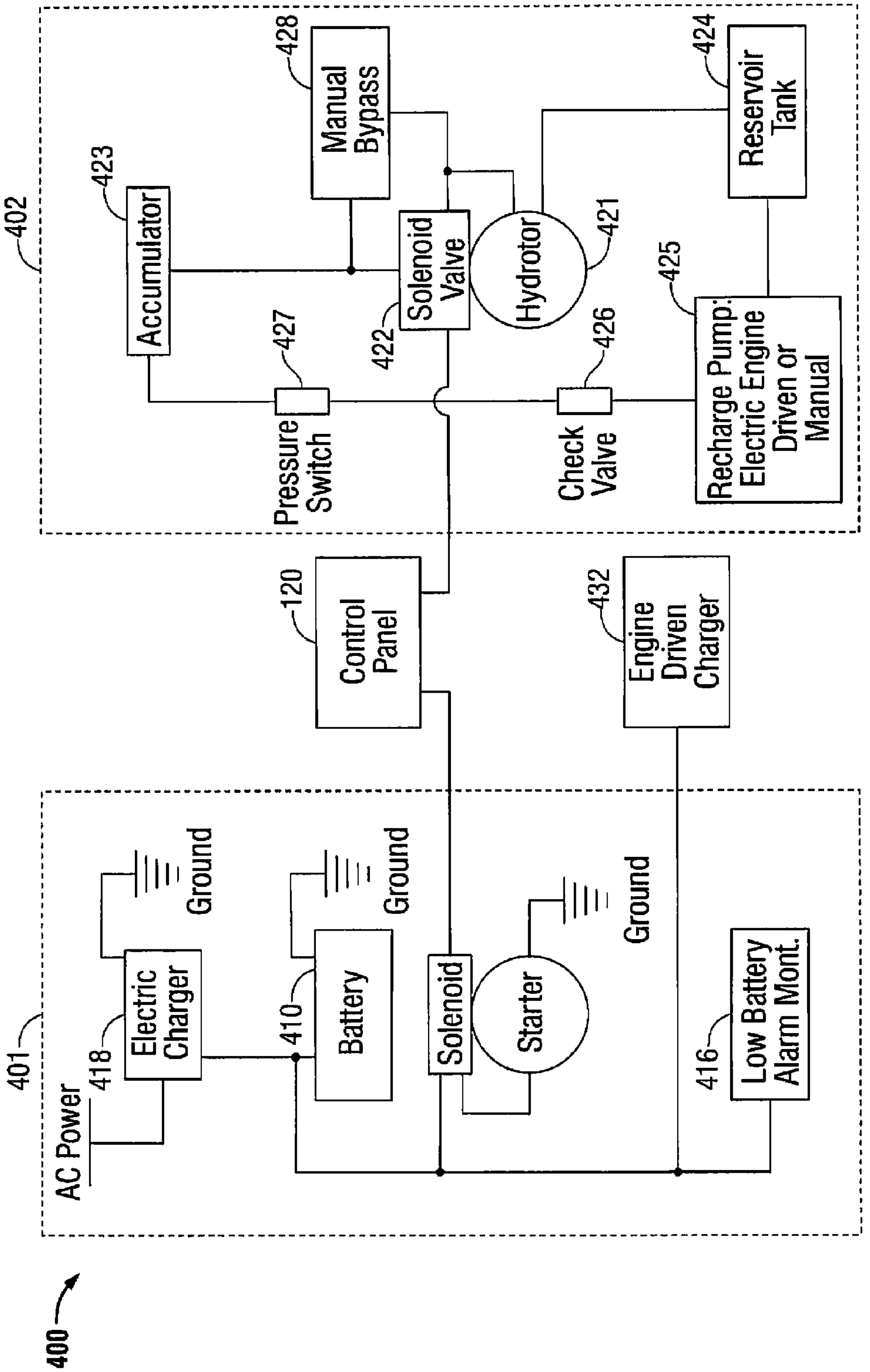
FIG. 4 depicts a system block diagram of a starting system according to another embodiment of the present disclosure.

FIG. 4 depicts a dual starting system according to another embodiment of the present disclosure shown generally as system 400. System 400 includes an electric starter 401 similar to electric starter 201 shown in FIG. 2 and, as such, will not be described in greater detail below. Although FIG. 4 shows battery 410 of electric starter 401 is coupled directly electric charger 418, electric starter 418 may be indirectly coupled to electric charger 418 via a switch or any other circuit components. Further, battery 410 may also be charged using an engine driven charger or alternator 432.

System 400 also includes a hydraulic starter 402. Hydraulic starter 402 includes a hydraulic starter motor or hydrotor 421 and an electro-mechanical high pressure solenoid valve 422 that will open upon receiving a crank signal from control panel 120. When solenoid valve 422 opens, pressurized hydraulic fluid from a hydraulic accumulator or tank 423 passes to hydrotor 421. Hydraulic accumulator 423 is sized appropriately for 10 second of continuous cranking. The size of accumulator 423 may be changed by design to accommodate different periods of time for cranking hydrotor 421. The size of the accumulator is a function of the engine (112) cubic inches and hydrotor 421 starter volume. Accumulator 423 is a nitrogen over hydraulic tank, whereby the nitrogen is contained in a rubber or fluoroelastomer bladder which applies pressure against the hydraulic fluid.

Accumulator 423 is recharged by an electric motor driven or engine driven recharge pump 425. Pump 425 recharges accumulator 423 until accumulator 423 reaches a predetermined pressure at which point a disconnect clutch stops recharging of accumulator 423. A check valve 426 is disposed between pump 425 and accumulator 423 to prevent hydraulic fluid from flowing from accumulator 423 to pump 425. Pump 425 supplies accumulator 423 with hydraulic fluid from reservoir tank 424. During operation of hydraulic starter 402, when hydraulic fluid is supplied to hydrotor 421 from accumulator 423, the hydraulic fluid passes through hydrotor 421 into reservoir tank 424. Then the hydraulic fluid in reservoir tank 424 is used to recharge accumulator 423. The act of restoring the hydraulic fluid within accumulator 423 to its original volume, and pressing against the nitrogen results in generating the potential pressure for another start attempt. Typical accumulator pressure is up to 5000 psi.

Sensor 416 monitors battery 410. Upon a low voltage situation, sensor 416 alerts the operator via indicator 126. Optionally upon having this condition, control panel 120 will employ the hydraulic starter 402 immediately. Control panel 120 will also have a pressure monitor 427 that will monitor hydraulic pressure. Should a low pressure situation exist, a "low start pressure" fault will be met and an alarm signal given by indicator 126. The hydraulic system 402 will lock out during crank attempts when a "low start pressure" fault exists.

Hydraulic starter 402 may include a manual bypass 428 that would allow a user to crank engine 112 in the event that there is a loss of battery power such that control panel 120 can not send a signal to solenoid 422. Manual bypass 428 allows the compressed hydraulic fluid to reach the hydrotor 421.

Figure 5:
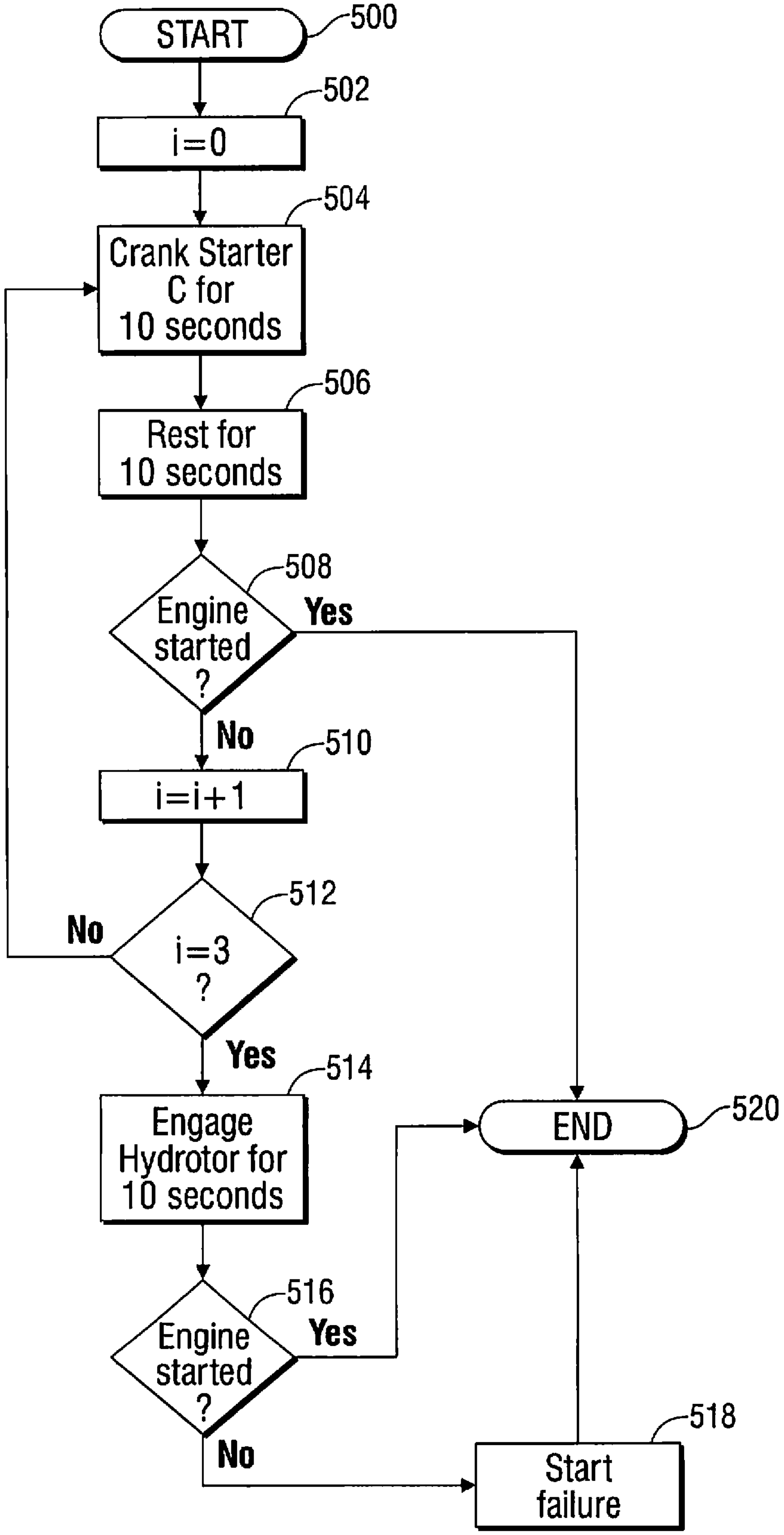
FIG. 5 is a flow chart depicting a method of starting a generator according to another embodiment of the present disclosure.

A flowchart depicting an operation of a dual starter system having an electric starter (starter C) and a hydraulic starter is shown in FIG. 5. The process starts in step 500 when the control panel 120 is instructed to start generator 110. Generator 110 may be started upon receiving an input from a user or when power from a main power supply (e.g., a utility company) is disrupted. The process proceeds to step 502 where a counter (in processor 121) is set to "0". In step 504, starter C is cranked for a period of time, e.g., 10 seconds. A digital timer (not shown) in control panel 120 or processor 121 may be used to control the amount of time starter C is cranked. In step 506, starter C rests for a period of time, e.g., 10 seconds. If control panel 120 determines that engine 112 has started in step 508, the process proceeds to step 520 that ends the starting sequence because engine 112 is operating.

If control panel 120 determines that engine 112 has not started, control panel 120 increments the counter by one in step 510. In step 512, processor 121 determines if the value of the counter is equal to 3. If the counter value is not 3, the control panel proceeds to step 504 to start another cranking cycle. If the value of the counter has equaled three, then the process proceeds to step 514 where hydrotor 421 is cranked for 10 seconds. In step 516, control panel 120 determines whether engine 112 has started. If engine 112 has started, the process proceeds to step 520 where the starting sequence ends. If control panel 120 determines that engine 112 has not started, the process proceeds to step 518 and control panel indicates a start failure via indicator 126.

Figure 6:
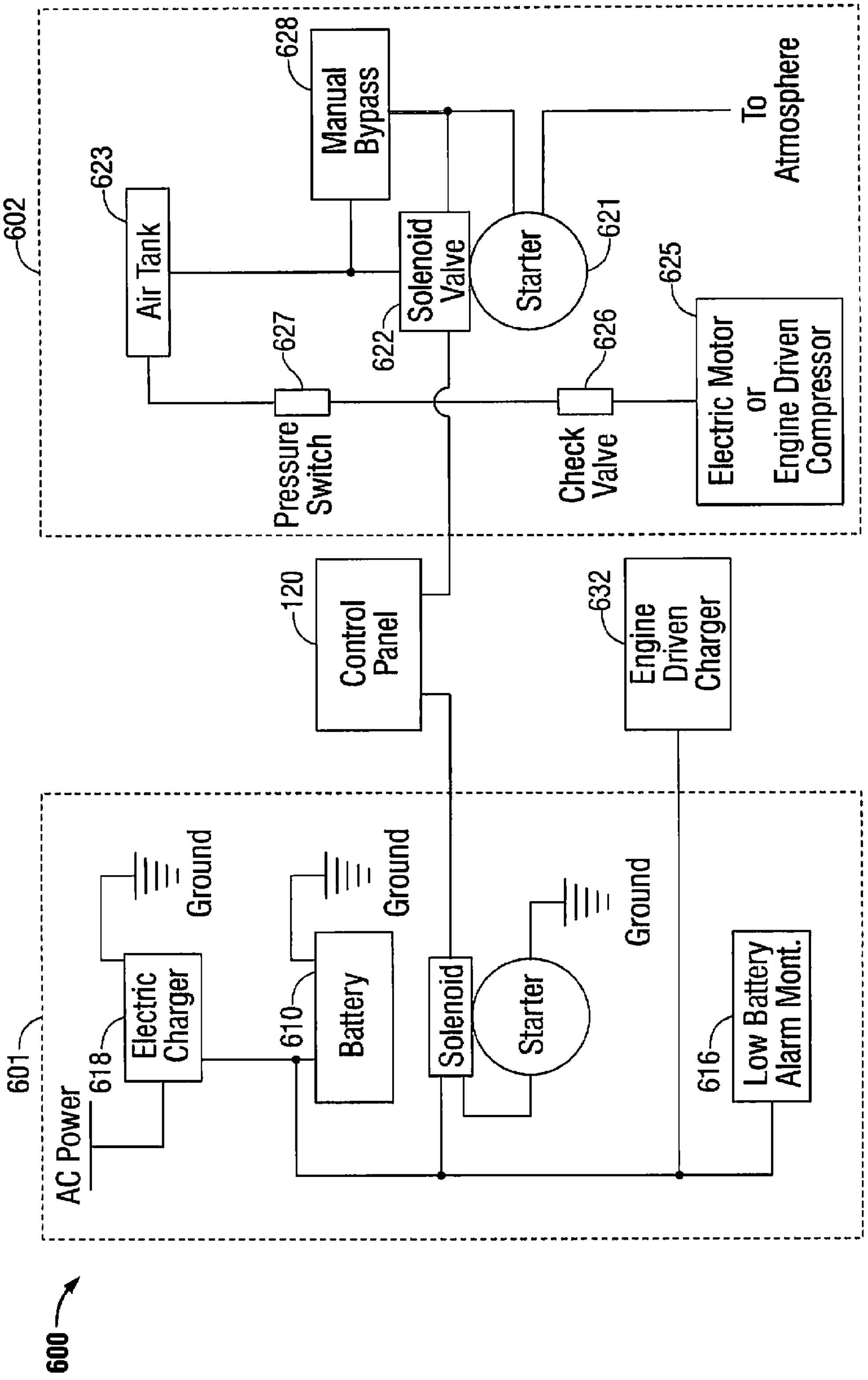
FIG. 6 depicts a system block diagram of a starting system according to another embodiment of the present disclosure.

FIG. 6 depicts a dual starting system according to another embodiment of the present disclosure shown generally as system 600. System 600 includes an electric starter 601 similar to electric starter 201 shown in FIG. 2 and, as such, will not be described in greater detail below. Although FIG. 6 shows battery 610 of electric starter 601 is coupled directly electric charger 618, electric starter 618 may be indirectly coupled to electric charger 618 via a switch or any other circuit components. Further, battery 610 may also be charged using an engine driven charger or alternator 632.

System 600 also includes an air starter 602. Air starter 602 includes a air starter motor or air turbine 621 and a electromechanical solenoid valve 622 that will open upon receiving a crank signal from control panel 120. When solenoid valve 622 opens, compressed air from an air accumulator or tank 623 passes to air starter motor 621. Air accumulator 623 is sized appropriately for 10 second of continuous cranking. The size of accumulator 623 may be changed by design to accommodate different periods of time for cranking air starter motor 621. The size of accumulator 623 is a function of the engine (112) cubic inches and air starter motor 621 starter volume.

Accumulator 623 is recharged by an electric motor driven or engine driven recharge compressor 625. Compressor 625 recharges accumulator 623 until accumulator 623 reaches a predetermined pressure at which point a disconnect clutch or unloader valve stops recharging of accumulator 623. A check valve 626 is disposed between compressor 625 and accumulator 623 to prevent air from flowing from accumulator 623 to compressor 625. Compressor 625 supplies accumulator 623 with air from the atmosphere. During operation of air starter 602, when compressed air is supplied to air starter motor 621 from accumulator 623, the compressed air passes through air starter motor 621 to the atmosphere.

Sensor 616 monitors battery 610. Upon a low voltage situation, sensor 616 alerts the operator via indicator 126. Optionally upon having this condition, control panel 120 will employ the air starter 602 immediately. Control panel 120 will also have a pressure monitor 627 that will monitor air pressure. Should a low pressure situation exist, a "low air pressure" fault will be met and an alarm signal given by indicator 126. The air system 602 will lock out during crank attempts when a "low air pressure" fault exists.

Air starter 602 may include a manual bypass 628 that would allow a user to crank engine 112 in the event that there is a loss of battery power such that control panel 120 can not send a signal to solenoid 622. Manual bypass 628 allows the compressed air to reach the air starter motor 621.

Figure 7:
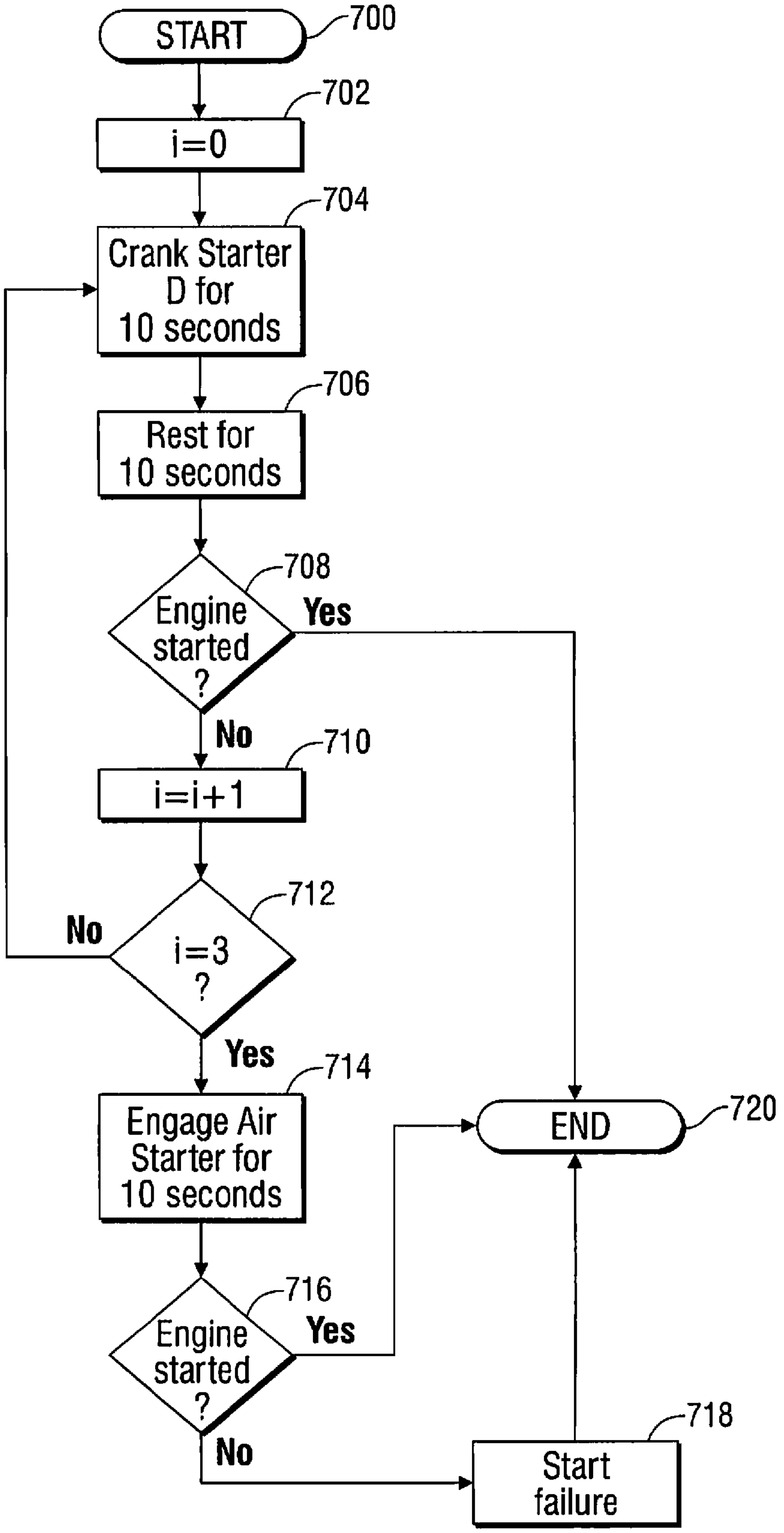
FIG. 7 is a flow chart depicting a method of starting the generator according to another embodiment of the present invention.

A flowchart depicting an operation of a dual starter system having an electric starter (starter D) and an air starter is shown in FIG. 7. The process starts in step 700 when the control panel 120 is instructed to start generator 110. Generator 110 may be started upon receiving an input from a user or when power from a main power supply (e.g., a utility company) is disrupted. The process proceeds to step 702 where a counter (in processor 121) is set to "0". In step 704, starter D is cranked for a period of time, e.g., 10 seconds. A digital timer (not shown) in control panel 120 or processor 121 may be used to control the amount of time starter D is cranked. In step 706, starter C rests for a period of time, e.g., 10 seconds. If control panel 120 determines that engine 112 has started in step 708, the process proceeds to step 720 that ends the starting sequence because engine 112 is operating.

If control panel 120 determines that engine 112 has not started, control panel 120 increments the counter by one in step 710. In step 712, processor 121 determines if the value of the counter is equal to 3. If the counter value is not 3, the control panel proceeds to step 704 to start another cranking cycle. If the value of the counter has equaled three, then the process proceeds to step 714 where air starter motor 621 is cranked for 10 seconds. In step 716, control panel 120 determines whether engine 112 has started. If engine 112 has started, the process proceeds to step 720 where the starting sequence ends. If control panel 120 determines that engine 112 has not started, the process proceeds to step 718 and control panel indicates a start failure via indicator 126.

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances. The embodiments described with reference to the attached drawing figs. are presented only to demonstrate certain examples of the disclosure. Other elements, steps, methods and techniques that are insubstantially different from those described above and/or in the appended claims are also intended to be within the scope of the disclosure.

What is claimed is:

1. An engine-generator comprising:

an engine;

an electrical generator;

a control panel configured to control the engine-generator;

an electrical starter including:

- a battery;
- a solenoid configured to receive a starting signal from the control panel; and
- a starter motor configured to crank the engine when the solenoid receives the starting signal from the control panel; and an air starter including:

- a solenoid valve configured to receive a starting signal from the control panel;

an air starter motor configured to crank the engine when the solenoid valve receives the starting signal from the control panel; and an air accumulator configured to supply compressed air to the air starter motor when the solenoid valve receives the starting signal from the control panel.

2. The engine-generator according to claim 1, wherein the electrical starter includes an electric charger configured to recharge the battery.

3. The engine-generator according to claim 1, further comprising a compressor configured to supply the air accumulator with air from atmosphere.

4. The engine-generator according to claim 3 wherein the compressor is driven by the engine.

5. The engine-generator according to claim 3 wherein the compressor is driven by an electric motor.

6. The engine-generator according to claim 1, further comprising an alternator configured to recharge the battery.

7. The engine-generator according to claim 1, wherein the air starter further comprises a manual bypass to crank the engine.

* * * * *